Oct. 20, 1925.  
A. CHAUSSEPIED  
ROTARY POWER PLANT  
Filed Nov. 5, 1921
1,557,557
2 Sheets-Sheet 2
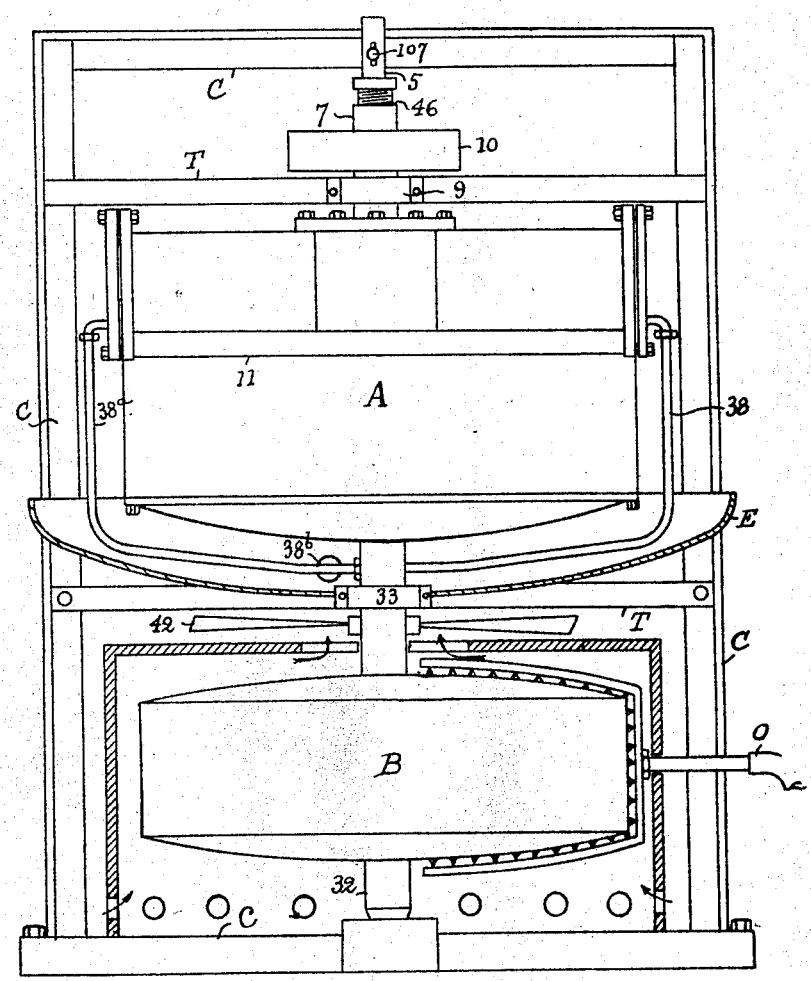

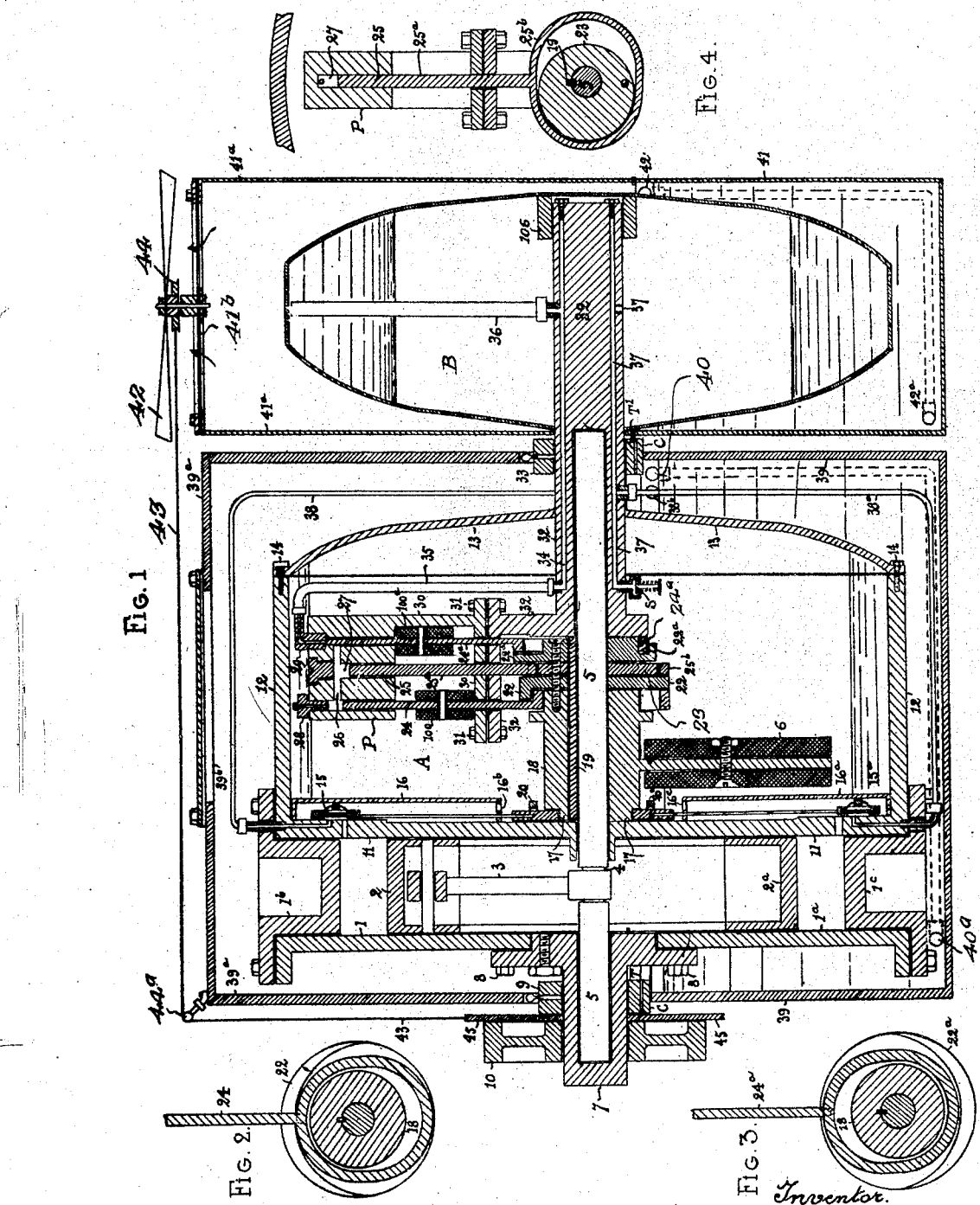

Patented Oct. 20, 1925.

1,557,557

UNITED STATES PATENT OFFICE.

ALEXIS CHAUSSEPIED, OF SAUMUR, FRANCE.

ROTARY POWER PLANT.

Application filed November 5, 1921. Serial No. 513,208.

*To all whom it may concern:*

Be it known that I, ALEXIS CHAUSSEPIED, a citizen of the French Republic, residing at Saumur, France, 41 Quai Wilson, have invented a certain new and useful Rotary Power Plant, of which the following is a specification.

The present invention relates to a reversible rotary engine operating at will either as a generator of power, or as a refrigerator. The said machine is thus capable of transforming into motive power the heat supplied thereto, or inversely of restoring in the shape of cold units the motive power received.

The engine according to the present invention essentially comprises two hermetically closed vessels in periodic communication with each other, the said vessels being mounted in such a manner as to act like a unitary structure and rotating together on a common shaft. When the engine operates as a motor one of the vessels acts as a generator and the other as a condenser. When the engine, driven in the reverse direction, operates as a refrigerator, the evaporator acts as condenser and the condenser fulfills the function of a cooler.

Use is made as a generator of power or as a cooling medium of an agent having a low temperature of volatilization, for instance a liquefied gas such as sulfur dioxide, methyl chloride, or the equivalent, of which the lubricating properties facilitate the operation of the movable parts.

Owing to the small change in temperature which such agents require to produce medium pressures, and to the very high pressures produced by high temperatures, the generator is not directly subjected to the action of heat, but the latter is transmitted thereto through the medium of water, air, etc., or of steam in the case of high pressures. The vapours produced act inside movable cylinders sliding on fixed pistons connected by means of connecting rods to a central inner shaft maintained in fixed position by a balance weight and about which the whole of the engine revolves. The vapours are exhausted through the medium of a set of distribution valves arranged within one of the vessels, and a pump brings back to the evaporator the liquid resulting from the condensation of the vapours.

When, under the influence of external power, the engine is caused to rotate in a direction reverse to the direction of the movement imparted thereto as a motor, it becomes a refrigerator. In such case the cylinders and plungers act successively to draw off or suck the vapours from the evaporator (which was the condenser of the motor) and to deliver them into the condenser (which was the generator of vapours of the motor). During the aforesaid reverse movement, the pump acts similarly to pump the liquid from the condenser into the evaporator.

Owing to the low temperature of vaporization of the liquid employed, the motor is able to run with low temperatures, such as for instance that of the solar heat, the reduction of temperature of the condenser being obtained through the evaporation on the surface thereof of a thin layer of water, which may be rendered more active by means of a fan actuated by the motor itself.

The accompanying drawing illustrates, by way of example only, an embodiment of a rotary engine according to the invention.

In the said drawing:

Fig. 1 is a vertical section through the complete apparatus,

Fig. 2 is a detail of a cam controlling the action of the valves of the pump for the liquid, Fig. 3 shows another of the cams controlling the valves of the said pump, Fig. 4 is a detail of the cylinder and of the plunger of the pump for the liquid and the device controlling the action thereof.

Fig. 5 shows the complete construction of an engine having a vertical axis, the fixed shaft being integral with the frame supporting the engine.

Referring to Fig. 1, the two cylinders 1 and 1ª constitute in fact a single cylinder divided in two portions, in which are arranged the pistons 2 and 2ª which also form in fact a single piston with double action. The cylinders 1 and 1ª are closed by means of ends 1ᵇ and 1ᶜ.

A connecting rod 3 connects one of the ends of the double piston to the crank 4 of a crank shaft 5, which is maintained in fixed position by a balance weight 6 integral with a sleeve 18 secured on the shaft 5 by means of a key 19. The other parts of the apparatus rotate on the shaft 5. It will be noticed that if the cylinders 1 and 1ª are caused to revolve together with the vessel A, the fact that the pistons 2 and 2ᵃ are thus imparted a movement of translation, i. e. an annular movement, about an axis (i. e. the axis of the crank 4) eccentric in relation to the axis about which the cylinders revolve, will cause the said pistons to move in relation to the said cylinders. The cylinder 1, 1ᵃ carries at the centre and on its outer face a hub 7 secured thereto, with a water tight joint, by means of bolts 8, and recessed at the centre to receive one end of the shaft 5, on which it is able to rotate, while at the same time it rotates in a bearing 9 provided with a grease cup. The said bearing is supported on a transverse member T integral with a rigid frame C on which is also fixed another transverse member T′ carrying another bearing 33. The whole engine is supported by the rigid frame C. A pulley 10 keyed on to the hub 7 serves for the transmission or the reception of the motive power. A grooved pulley 45 serves to drive the fan 42 through the medium of the grooved pulley 44 and of the cable 43 passing over the angle sheaves 44ᵃ.

The wall of the cylinder 1, 1ᵃ opposite the hub 7, is formed by a disc 11, the said disc being at its periphery integral with a cylinder 12 on which a cover or lid 13, welded on the fitting 32, is secured by means of screws 14 so as to obtain a vessel A which is hermetically closed.

This vessel fulfills the function of an evaporator (generator of vapours) when the apparatus acts as a motor, and of a condenser when, on the contrary, it acts as a refrigerator.

Within the vessel A are arranged on the disc 11 the two valves 15 and 15ᵃ for the distribution of the vapours, which valves are enclosed in valve-chests 16 and 16ᵃ provided with ports 16ᵇ, 16ᶜ for the passage of the vapours towards the inside of the vessel A. The said valve-chests also possess holes for the passage of the rods of the valves and for guiding same. The said rods are secured to a collar, similar to that illustrated by Fig. 4, mounted on an eccentric 17 cut in the fitting 18. To the end of the fitting 18 opposed to the eccentric 17 are secured by means of a screw or in any other suitable manner two cams 22, 22ᵃ between which is situated an eccentric 23. The cams 22, 22ᵃ (Figs. 2 and 3) control the action of the distribution valves 24, 24ᵃ of the feed pump P owing to the fact that they influence projections formed at right angles on collars constituting extensions of the lower ends of the rods of the said valves. The plunger 25 of the feed pump P is operated by a rod 25ᵃ integral with a collar 25ᵇ mounted round the eccentric 23 (Fig. 4). A channel 26, controlled by the valves 24, 24ᵃ allows the establishment of communication between the cylinder 27 of the pump P and either the inside of the vessel A (delivery into the evaporator of the liquid from the condenser the valve 24 being opened and the valve 24ᵃ being closed) through the passage bored through the plug 28, or of the vessel B (delivery into B of the liquid from the vessel A, the valve 24 being closed and the valve 24ᵃ being opened) through the passage bored in the right angled plug 29, the pipe 35, the passage 34 bored in the fitting 32, and the pipe 36 fitted on the said fitting 32. The pump P is provided with a support 30 secured by means of bolts 31 on the fitting 32, in which a recess is bored to receive the end of the shaft 5 in relation to which the said fitting having the lid 13 of the vessel A welded thereto, rotates. The base of the support 30 and the adjacent extension of the fitting 32 have holes provided therethrough to allow the passage of the rod of the plunger 25 and of the rods of the distribution valves 24, 24ᵃ and to guide the said rods. On the rods of the distribution valves 24, 24ᵃ are secured small heavy masses 100, 100ᵃ assuring their operation through the influence of centrifugal force when they leave the cams 22, 22ᵃ so that they close each in turn the channel 26 and also the passages provided through the plugs 28 and 29. The said valves are at the required moment brought back to the open position through the right angled projection integral with the collars forming the extensions of the lower ends of their respective rods engaging the cams 22, 22ᵃ (Figs. 2 and 3) which are rigidly secured on and integral with the shaft 5 on which the fitting 32 rotates. The output of the pump P is such that, when the apparatus acts as a motor (at maximum pressure) it is able to pump from the condenser B into the generator A a quantity of condensed liquid at least equal to that produced by the condensation of the vapours passing during the same time through the cylinders 1, 1ᵃ so that, when the engine acts in the aforesaid conditions, almost the totality of the liquid is constantly in the vessel A.

When on the contrary the apparatus acts as a refrigerator, the pump P sucks the liquid from the vessel A to deliver it into the vessel B.

The fitting 32 is provided with a passage 37 bored therethrough and which allows placing into communication the inside of the vessel B and the slide valves 15, 15ᵃ through the external piping 38, 38ᵃ, the former being branched on the latter by means of a union-piece 38ᵇ; the passage 37 is extended towards the vessel A into which it opens, to receive a safety valve S adjusted to act at the maximum pressure allowed for the motor and beyond which the said safety valve opens from the outside towards the inside to allow the escape of the excess of vapours which thus go directly from the vessel A into the vessel B. On the piece 32 is welded the vessel B formed of two opposed dish-like plates connected by a cylindrical portion to which they are welded. An inner hub 106 surrounding the end of the fitting 32 is provided to fit this vessel more securely to the said fitting.

The vessel A, as well as the cylinders and pipes behaving as a solid unit therewith, have a movement of rotation in the water contained in a tank 39, provided with openings 40, 40$^a$ for the circulation of hot or cold water according to the conditions in which the apparatus is employed (as a motor or as a refrigerator). The vessel B revolves in the water contained in a tank 41 or in a solution of salt when the apparatus generates cold. Openings 42, 42$^a$ allow the circulation of the required quantity of water or solution of salt.

The tanks 39 and 41 have thereon covers 39$^a$, 41$^a$ for the purpose of catching the water projected by the rotation of the vessels A and B and on which it is possible to secure at will (above openings 39$^b$, 41$^b$ provided for the purpose) the fan 42 which is placed on the cover of the vessel used as condenser the opening of the other cover being closed by means of a suitable plate.

Fig. 5 shows an embodiment of a vertically arranged apparatus. The inner balance-weight is done away with in such case, and the shaft 5 projects through a gland 46 on the end of the fitting 7, and is fixed in position by means of a bolt 107 integral with the rigid frame C provided with transverse members T on which are secured the bearings 9 and 33. The fitting 32 projects outside the vessel B in an extension of the casing of the said vessel, and is supported in a foot-step bearing solid with the frame C. The cooling water is distributed by a pipe O on the vessel which is used as condenser, and which is also subjected to the action of the fan 42.

An insulating screen E is placed between the 2 vessels; it may be arranged either as a reflector or as a condenser of the solar rays on the vessel A when the apparatus acts as a motor using solar heat.

It may also be used in the vertical position as a refrigerator, A being the condenser and B the evaporator, for instance to maintain automatically a constant temperature in fermentation tanks, holds of ships, wagons, and the equivalent. The vessel A acting as a condenser, and being maintained at a low temperature, if the temperature of the medium in which the vessel B is immerged is raised, the vapours resulting from this rise of temperature act inside the cylinders 1, 1$^a$, and cause the rotation of the apparatus, which brings the fan into action. The vaporization of the wet surface of the vessel A produces the cooling of the cylinders 1, 1$^a$. The pump P pumps the liquid resulting from the said condensation into the vessel B, wherein the continuous vaporization thereof produces a reduction of temperature influencing the surrounding medium until the moment when the temperature of the vessel B is approximately equal to that of the vessel A.

The operation of the engine is as follows:

When it is intended to use the apparatus as a motor, the tanks 39 and 41 are filled with water and provided with their covers 39$^a$ and 41$^a$. The fan is placed on the latter, which is intended to cover the condenser, and the opening in the cover 39$^a$ is closed by means of the plate provided for the purpose.

If, in any convenient manner, the temperature of the water of the tank 39 is raised, the pressure of the vapours in the corresponding vessel increases and the pressure of the said vapours acts inside the cylinder which at the time being is in communication with the inside of the vessel B wherein the pressure is lower. Owing to the difference of pressure existing in the cylinders and to the resistance to the rotation opposed by the shaft 5 carrying the crank 4 the apparatus starts its rotation and then, when the first cylinder is entirely filled with vapour and the opposed cylinder is empty, owing to the action of the collar controlling the operation of the slide valves, the slide valve of the last named cylinder establishes the communication between the said cylinder and the vessel A, while the opposed cylinder is in communication (for the exhaust of the vapours which it contains) with the vessel B wherein the condensation occurs. The movement of rotation of the appartus is thus obtained. Owing to this movement the fan is brought into action and causes the vaporization of the layer of water covering the outer surface of the vessel B wherein the vapours are condensed owing to the consequent reduction of temperature.

At the same time, the pump P operates: while the plunger delivers (owing to the influence of the fixed eccentric 23), the valve 24$^a$ is closed through the action of the centrifugal force and the valve 24 is open, the right angled projection on the collar forming the extension of the corresponding valve rod being retained by the cam 22 to allow the passage of liquid towards the inside of the vessel A. When all the liquid is delivered and the plunger 25 starts its sucking movement, the valve 24 disengaged by the cam 22 closes under the influence of centrifugal force the channel 26 and the passage through the plug 28, while the valve 24$^a$ is engaged by the cam 22$^a$ and brought back towards the centre to establish the communication between the vessel B and the cylinder 27, which is therefor filled with liquid. These various movements of the pistons, sliding valves for the distribution of the vapour, and parts of the pump, are repeated automatically for each revolution and the motor runs continuously as long as the temperature is higher in the vessel A than in the vessel B.

When employed as a refrigerator, the apparatus receives through the pulley 10 motive power which imparts thereto a movement of rotation in a direction opposed to that of the apparatus acting as a motor; as a result, the movements which have just been indicated are produced in the reverse direction. The set of cylinders and slide valves therefor causes the suction of the vapours from the vessel B which becomes an evaporator or cooler and their delivery into the vessel A which acts as a condenser and on the cover $39^a$ of which the fan 42 is placed. Owing to the reverse movement of the distribution valves 24, $24^a$ the pump P sucks the liquid which condenses in the vessel A and delivers same into the vessel B where its continuous vaporization produces cold.

It should be expressly understood that the present engine lends itself to various forms of construction and numerous modifications in its details, and that to the parts described and illustrated by way of example there may be substituted other parts serving the same purpose or producing a similar result.

I claim:

1. In a rotary engine, the combination of two substantially cylindrical closed vessels (A) and (B); two tanks enclosing said vessels; an outer shaft rotatably supported in said tanks and having said vessels secured thereon; a pulley secured on the said shaft outwardly of the tanks; an inner shaft extending across the first vessel (A) and rotatably supported in relation to the outer shaft, said inner shaft having a crank formed thereon; a set of radially disposed cylinders formed integrally in one of the end-walls of said first vessel (A); a corresponding set of rigidly assembled pistons arranged in said cylinders; a connecting rod between said set of pistons and the crank on the inner shaft; a sleeve keyed on the last-named shaft; means on said sleeve for preventing the rotation of said shaft; a set of valve-chests arranged against the wall of the cylinders inside the first vessel (A) and in communication on the one hand with the said vessel and on the other hand with said cylinders; slide-valves in said chests controlling the last-named communication; means on the sleeve for operating said slide valves; a pipe communication between the second vessel (B) and said slide-valves; a radially disposed pump rigidly mounted on the outer shaft within the first vessel (A) and in relation on the one hand with the inside of said first vessel (A) and on the other hand with the inside of the second vessel (B); said pump including a pair of centrifugally influenced valves; and means on the inner shaft for operating said pump; all substantially as described.

2. In a rotary engine, the combination of two substantially cylindrical closed vessels (A) and (B); two tanks enclosing said vessels and having an upper opening provided with a removable cover; a partially hollow outer shaft rotatably supported in said tanks and having said vessels secured thereon, said shaft being formed of two aligned sections longitudinally spaced within the first-named vessel (A); a pulley secured on the said shaft outwardly of the tanks; an inner shaft extending between the two sections of and rotatably mounted in relation to said outer shaft, said inner shaft having a crank formed thereon; a set of radially disposed cylinders formed integrally in one of the end-walls of the first vessel (A) a corresponding set of rigidly assembled pistons arranged in said cylinders; a connecting rod between said set of pistons and the crank on the inner shaft; a sleeve keyed on said inner shaft; means on said sleeve for preventing the rotation of the last-named shaft; a set of valve-chests arranged against the wall of the cylinders inside the first vessel (A) and in communication on the one hand with the said vessel and on the other hand with said cylinders; slide-valves in said chests controlling the last-named communication; means on the sleeve for operating said slide-valves; a pipe communication between the second vessel (B) and the slide-valves; a radially disposed pump structure rigidly mounted on the outer shaft within the first vessel (A), said pump structure including a cylinder with piston and a pair of valve-chambers in communication on the one hand with said cylinder and on the other hand with the inside of the first vessel (A) and of the second vessel (B) respectively; a pair of centrifugally influenced valves working in said valve-chambers; means on the inner shaft for operating the piston of the pump and the said centrifugally influenced valves in suitable sequence; and a communication between the two aforesaid vessels bored in the outer shaft and having its end opening out into the first of said vessels (A) fitted with a spring controlled safety valve adapted to be lifted on the pressure within said first vessel exceeding a predetermined limit; substantially as described.

3. In a rotary engine, the combination of two substantially cylindrical closed vessels (A) and (B); two tanks enclosing said vessels and having an upper opening provided with a removable cover; a partially hollow outer shaft rotatably supported in said tanks and having said vessels secured thereon, said shaft being formed of two aligned sections longitudinally spaced within the first-named vessel (A); a pulley secured on the said shaft outwardly of the tanks; an inner shaft extending between the two sections of and rotatably mounted in relation to said outer shaft, said inner shaft having a crank formed thereon; a set of radially disposed cylinders formed integrally in one of the end-walls of the first vessel (A); a corresponding set of rigidly assembled pistons arranged in said cylinders; a connecting rod between said set of pistons and the crank on the inner shaft; a sleeve keyed on said inner shaft; means on said sleeve for preventing the rotation of the last-named shaft; a set of valve-chests arranged against the wall of the cylinders inside the first vessel (A) and in communication on the one hand with the said vessel and on the other hand with said cylinders; slide-valves in said chests controlling the last-named communication; means for operating said slide valves, said means comprising an eccentric formed on the sleeve and adapted to be engaged by an elongated collar integral with the ends of the valve-rods of said valves; a pipe communication between the second vessel (B) and the slide valves; a radially disposed pump structure rigidly mounted on the outer shaft within the first vessel (A), said pump structure including a cylinder with piston and a pair of valve-chambers in communication on the one hand with said cylinder and on the other hand with the inside of the first vessel (A) and of the second vessel (B) respectively; a pair of centrifugally influenced valves working in said valve-chambers; means on the inner shaft for operating the piston of the pump, said means comprising an eccentric adapted to be engaged by an elongated collar integral with said piston; means on said inner shaft for controlling the operation of the centrifugally influenced valves, said means comprising discs having projecting cams formed at right angles thereon and in engagement with elongated collars integral with the rods of said valves; and a communication between the two aforesaid vessels bored in the outer shaft and having its end opening out into the first of said vessels (A) fitted with a spring controlled safety-valve adapted to be lifted on the pressure within said first vessel exceeding a predetermined limit; substantially as described.

In testimony thereof I signed hereunto my name.

ALEXIS CHAUSSEPIED.